United States Patent
Shrivastava et al.

(10) Patent No.: US 12,105,772 B2
(45) Date of Patent: Oct. 1, 2024

(54) DYNAMIC AND CONTINUOUS COMPOSITION OF FEATURES EXTRACTION AND LEARNING OPERATION TOOL FOR EPISODIC INDUSTRIAL PROCESS

(71) Applicant: INTERNATIONAL BUSINESS MACHINES CORPORATION, Armonk, NY (US)

(72) Inventors: Shrey Shrivastava, White Plains, NY (US); Dhavalkumar C. Patel, White Plains, NY (US); Jayant R. Kalagnanam, Briarcliff Manor, NY (US); Chandrasekhara K. Reddy, Kinnelon, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 965 days.

(21) Appl. No.: 17/109,022

(22) Filed: Dec. 1, 2020

(65) Prior Publication Data
US 2022/0172002 A1 Jun. 2, 2022

(51) Int. Cl.
G06K 9/62 (2022.01)
G06F 9/54 (2006.01)
G06F 18/2113 (2023.01)
G06F 18/214 (2023.01)
G06N 20/00 (2019.01)

(52) U.S. Cl.
CPC .......... *G06F 18/2155* (2023.01); *G06F 9/541* (2013.01); *G06F 18/2113* (2023.01); *G06N 20/00* (2019.01)

(58) Field of Classification Search
CPC .. G06F 18/2155; G06F 9/541; G06F 18/2113; G06N 20/00; G06N 5/01
See application file for complete search history.

(56) References Cited

U.S. PATENT DOCUMENTS

| | | | |
|---|---|---|---|
| 5,609,156 A | * | 3/1997 | Keith .................. A61B 5/7264 600/483 |
| 6,611,726 B1 | | 8/2003 | Crosswhite |
| 2004/0117336 A1 | | 6/2004 | Basak et al. |

(Continued)

OTHER PUBLICATIONS

Ahmadzadeh, A. et al., "MVTS-Data Toolkit: A Python Package for Preprocessing Multivariate Time Series Data"; SoftwareX (2020); vol. 12; 6 pgs.

(Continued)

*Primary Examiner* — Maikhanh Nguyen
(74) *Attorney, Agent, or Firm* — Intelletek Law Group, PLLC; Gabriel Daniel, Esq.

(57) ABSTRACT

A computer implemented method of preparing process data for use in an artificial intelligence (AI) model includes collecting and storing raw data as episodic data for each episode of a process. An episode data generator assigns an episode identifier each set of episodic data. The raw data per episode is transformed into a standardized episodic data format that is usable by the AI model. Metrics are assigned to the episodic data and the episodic data is aggregated in an episode store. The data in the episode store is used by a feature extraction and learning module to extract and rank features.

14 Claims, 16 Drawing Sheets

(56) References Cited

U.S. PATENT DOCUMENTS

| | | | |
|---|---|---|---|
| 2015/0148040 A1* | 5/2015 | Ehrlich | H04W 36/00835 |
| | | | 455/436 |
| 2015/0235139 A1 | 8/2015 | Sharma et al. | |
| 2016/0253681 A1 | 9/2016 | de Souza et al. | |
| 2016/0328526 A1* | 11/2016 | Park | G06N 20/20 |
| 2017/0139558 A1 | 5/2017 | Cervelli et al. | |
| 2017/0284896 A1 | 10/2017 | Harpale et al. | |
| 2018/0144214 A1* | 5/2018 | Hsieh | G06T 7/0002 |
| 2019/0050948 A1* | 2/2019 | Perry | G06F 30/27 |
| 2020/0304396 A1* | 9/2020 | Said | H04L 43/0817 |
| 2021/0056114 A1* | 2/2021 | Price | G06F 16/24578 |

OTHER PUBLICATIONS

Barandas, M. et al., "TSFEL: Time Series Feature Extraction Library"; SoftwareX (2020); vol. 11; 7 pgs.

Yang, C. et al., "I Know You'll Be Back: Interpretable New User Clustering and Churn Prediction on a Mobile Social Application"; Association for Computing Machinery (2018); 9 pgs.

Xing, Z et al., "Extracting Interpretable Features for Early Classification on Time Series"; SDM (2014); 12 pgs.

Fulcher, B. D., "HCTSA: A Computational Framework for Automated Time-Series Phenotyping Using Massive Feature Extraction"; Cell Systems (2017); vol. 5; pp. 527-531.

Lee, R. et al., "Interpretable Categorization of Heterogeneous Time Series Data"; arXiv:1708.09121v2 [cs.LG] (2018); 9 pgs.

Wang, J. et al., "Multilevel Wavelet Decomposition Network for Interpretable Time Series Analysis"; Research Gate (2018); 11 pgs.

Liu, C. et al., "Root-Cause Analysis for Time-Series Anomalies via Spatiotemporal Graphical Modeling in Distributed Complex Systems" Knowledge Based Systems (2020); 15 pgs.

Patel, D. et al., "FLOps: On Learning Important Time Series Features for Real-Valued Prediction"; IBM (Date: Unknown); 10 pgs.

* cited by examiner

DYNAMIC AND CONTINUOUS COMPOSITION OF FEATURES EXTRACTION AND LEARNING OPERATION TOOL FOR EPISODIC INDUSTRIAL PROCESS

BACKGROUND

Technical Field

The present disclosure generally relates to artificial intelligence and machine learning systems, and more particularly, to methods and systems for standardization of industrial process data in the form of episodic time series data, methods and systems for feature extraction and learning operations (FLOps) from episodic time series data, and integrated machine learning operations (MLOps+) for improved model accuracy and speed.

Description of the Related Art

Industrial processes can be formed from a sequence of subprocesses or disciplines. A subprocess can be made up of either 1) temporal events occurring at regular intervals, or 2) samples of certain signals collected by sensors collected at regular intervals.

Building artificial intelligence (AI) models for industrial processes can be challenging for several reasons. First, the data generated from such processes presents a format that is not directly consumable by AI models. Although each subprocess is a time series, the right organization of time-series data is not available-especially, across different subprocesses. Hence, a canonical representation of such times-series data is required. Second, the process data has a fixed start and end point, unlike regular time series. Also, analysis of the entire process is used rather than windows within a time series. Third, the data obtained from processes is voluminous, as data is generated at second to hourly cadences. This can be a major obstacle in the model authoring and the model management phases. Fourth, the data from industrial processes is continually generated as a new iteration starts when the previous finishes. Fifth, there is a need for the AI model to stay up-to-date constantly since new process data distribution can change over time.

Given such time-series data, in addition to statistical characteristics of the data such as average, standard deviation, variance, and the like, future value prediction is almost always a necessity.

Such predictions are of different types, such as future values of the monitored devices, predicting time remaining to an upcoming event, and predicting spike or a failure in real time. Such predictions are highly valuable for process engineers as they use such predictions or system producing such analysis to prevent system failure or schedule preventive maintenance. Recent developments of systems, such as AutoAI or AutoML, provide for automated discovery of models and are useful option to build and deploy prediction models to predict time series values in automated fashion. However, the majority of such automated tools have largely focused on supporting tabular data, whereas IoT data are mostly time series with temporal dimension that is of high importance to time-series modeling. Moreover, such automated systems are not recommended for processes generating huge amounts of time-series data such as real-time monitoring of manufacturing which mostly includes thousands of sensors generating raw (multi-variate) time series signals.

Exploring hundreds of extracted features for an automated model discovery is a time-consuming and computation-intensive task. Therefore, a recent trend in the time-series community is to conduct extensive sets of benchmark experiments on publicly available datasets and identify a fixed set of key-features for subsequent analysis. For example, "catch22" provides a list of 22 feature extractors for building time series classification model. Once the time-series feature representations are identified for a particular task, any automated tool can be used for building models using learned representations.

Currently, a handful of research work has demonstrated the benefits of feature extractions for time series classification work. However, other critical time series tasks such as value forecasting, regression, anomaly detection, anomaly prediction, and the like, need to be modeled using extracted features. A straightforward extension to the proposed classification task based approach is to use exactly the same set of features for these other tasks. However, the recent benchmark on time-series clustering using "catch22" features suggest that there is significant room for improvement in 1) the way time series features are extracted and grouped, 2) the way the features are ranked, and 3) the way features are selected for the dataset other than those for classification tasks.

SUMMARY

According to various embodiments, a computing device, a non-transitory computer readable storage medium, and a method are provided for standardizing industrial process data as episodic time series data, using this episodic time series data in a feature extraction and learning module to provide ready features for machine learning operations.

In one embodiment, a computer implemented method of preparing process data for use in an artificial intelligence (AI) model includes collecting and storing raw data as episodic data for each episode of a process. An episode data generator can assign an episode identifier each set of episodic data. The raw data per episode can be transformed into a standardized episodic data format usable by the AI model. Outcome or quality metrics can be assigned to the episodic data and the episodic data can be aggregated in an episode store.

In some embodiments, the outcome metrics assigned to the episodic data include lab-generated and real-time metrics, such as pass/fail.

In some embodiments, the standardized episodic data format includes a table for each subprocess of the episode, the table including, for each time step of the subprocess, control variable values and sensor values.

In some embodiments, the method further includes communicating the arrival of data to a feature learning operations (FLOps) module.

In some embodiments, the method further includes waiting for a number of episodes until a predetermined number of the episodic data provides an outcome of the assigned metrics below a quality threshold.

In some embodiments, the method further includes assigning, by the FLOps module, features to a feature tag selected from one of on-arrival features, borderline features, on-demand features and blacklisted features. In some embodiments, the features are assigned the feature tags based on key performance indicators for measuring priority of extraction.

In some embodiments, the method further includes processing the standardized episodic data related to on-arrival features as the data is received, processing the standardized episodic data related to borderline features when computation resource usage permits, and processing the standardized episodic data related to on-demand features when needed by the AI model.

In some embodiments, the method further includes optimizing feature generation tasks when an application programming interface (API) calls of the AI model is invoked.

In some embodiments, the method further includes determining a number of recent historical episodes from which features need to be extracted for different API calls, extracting features from selected episodes using the assigned feature tags, sending the extracted features to the AI model, and evaluating performance of the AI model.

In some embodiments, the method further includes re-ranking and re-assigning the feature tags to features based on the key performance indicators for measuring priority of extraction and evaluating performance of the AI model.

According to various embodiments, a computer implemented method for managing feature learning and extraction in artificial intelligence (AI) lifecycle includes ranking and assigning feature tags to features based on key performance indicators for measuring priority of extraction. The feature tags can be stored for reference during feature extraction. The features from episodes can be extracted based on an application programming interface (API) request of an AI model using the stored feature tags. A features library can be constructed and maintained to include features that can be selected for ranking and assigning feature tags.

By virtue of the concepts discussed herein, a system and method are provided that improves upon the approaches currently used in industrial process AI models. The system and methods discussed herein can improve CPU cycle, decrease storage requirements, and increase response time by having certain features determined as may be required by the AI model and having other features not immediately determined from the episodic time series data, thus providing the above system benefits, without any significant negative impact to the quality of the AI models.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

As discussed in greater detail below, the present disclosure generally relates to systems and methods for handling industrial process data for times-series value prediction using machine learning models. Time-series prediction problems often have hundreds of available features. Aspects of the present disclosure provide a standardization of industrial process data that may be then used in a feature extraction and learning operation, where the hundreds of available features are filtered to the most useful features, as discussed in greater detail below. The feature extraction and learning operation can meet an emerging need from continuous integration of machine learning operations by optimizing feature readiness and improving CPU cycle efficiency, decreasing storage requirements, and increasing response time. An improved machine learning operation, using the optimized feature engineering provided by the feature extraction and learning operation as described herein, can improve time series value forecasting using machine learning models through improved model accuracy and computational speed. Thus, systems and methods provided by the present disclosure can provide a technical improvement in the efficiency, computational requirements, storage requirements and scalability of time-series value prediction using machine learning models for industrial processes.

Reference now is made in detail to the details illustrated in the accompanying drawings and discussed below.

Figure 1:
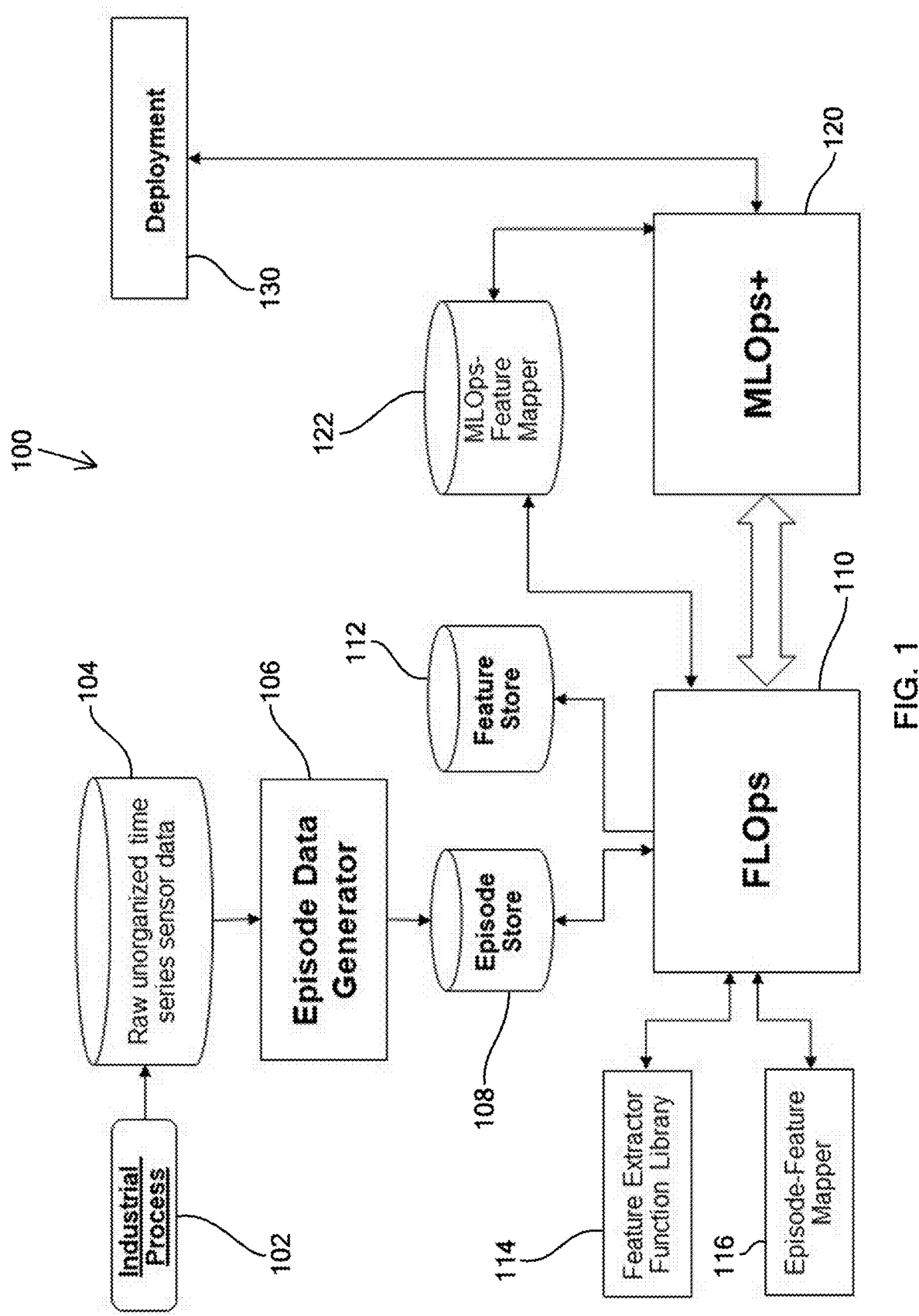
FIG. 1 is a schematic representation of an architecture for a system for dynamic and continuous composition of features-extraction and learning-operation tool for episodic industrial processes, according to an illustrative embodiment of the present disclosure.

Referring to FIG. 1, a system architecture 100 is shown, where an industrial process 102 generates raw unorganized time series sensor data 104 (sometimes simply referred to as raw data 104). As discussed in greater detail below, the raw data 104 can be treated with an episode data generator 106 and the results stored in an episode store 108. As also discussed in greater detail below, the data from the episode store 108 can be used by a features extraction and learning operations module (FLOps module) 110, which can filter relevant features (as described below) from a feature extractor function library 114 in a feature store 112. An episode-feature mapper 116 may be used to align which features map to certain episodes of the industrial process. The FLOps module 110 can interact, via a machine language feature mapper 112, with a modified machine learning operations module 120 (MLOps+ module) for deployment 130 to provide predictions for future industrial processes.

Figure 2:
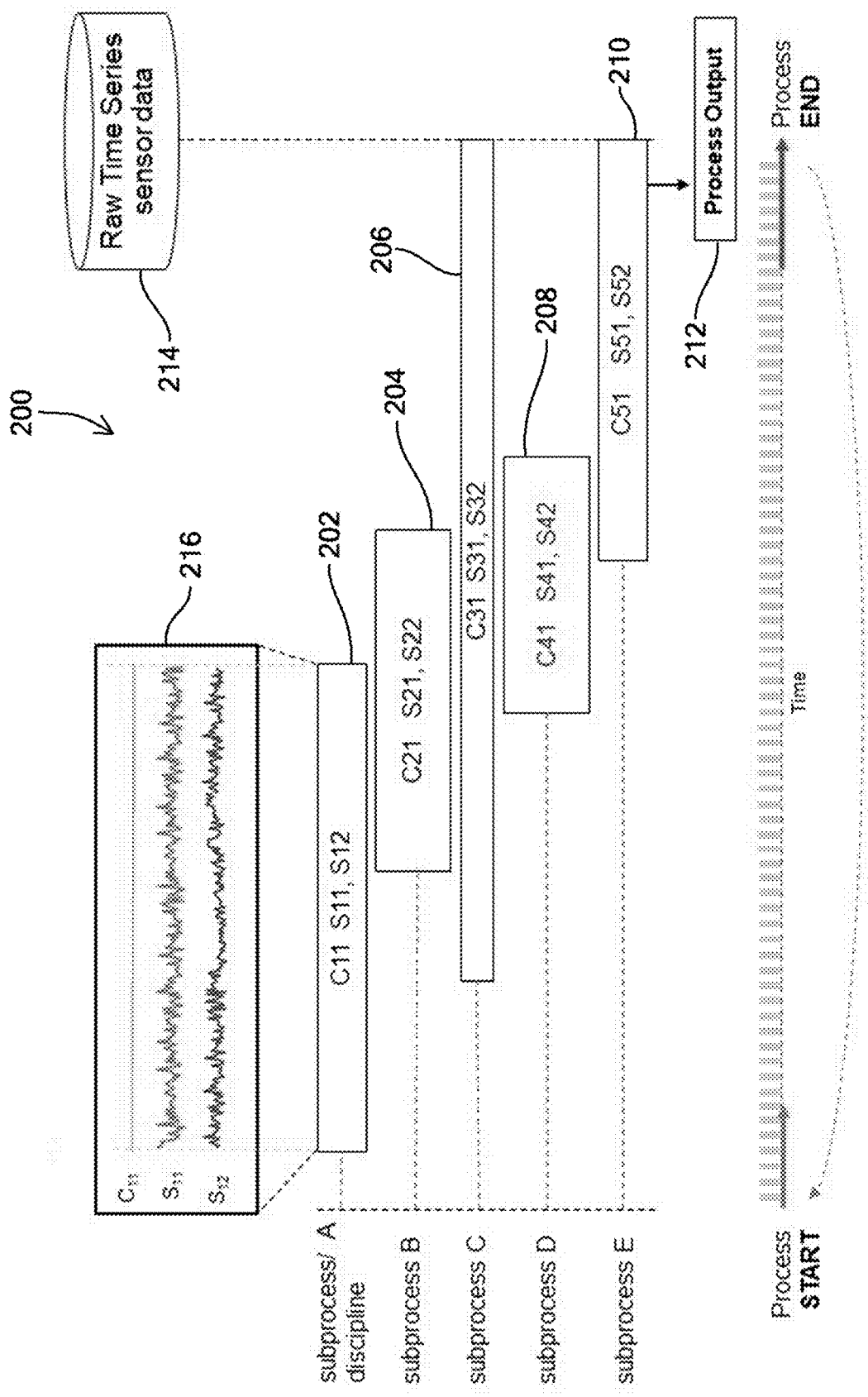
FIG. 2 is a graphical representation of an industrial process episode that generates data for the system of FIG. 1.

Referring now to FIG. 2, an industrial process episode 200 is illustrated. As used herein, an "episode" of an industrial process is one instance of one or more acts used to achieve a goal. One example of an industrial process episode may be a welding operation, for example, where two parts are joined together by a weld. Another example may be a chemical process step such as when an emulsifier is added to a mixture and stirred to create an emulsion. Typically, episodes are repeated and can be divided into a plurality of subprocesses.

The industrial process episode 200 can include a plurality of subprocesses (also referred to as disciplines), such as subprocess A 202, subprocess B 204, subprocess C 206, subprocess D 208, and subprocess E 210. A process output 212 is generated at the end of the episode 200 and raw time-series sensor data 214 from the episode is generated. The subprocess, such as subprocess A 202, can include control variables C11, typically provided by a user or pre-programmed as part of the industrial process, and sensor variables S11, S12, generated from sensors active during the subprocess A 202. Inset 216 provides a representation of the data obtained during the subprocess A 202. As can be seen, the data is typically not a stream of data for each subprocess over time, but, instead, the time series can overlap, where the sensors active for the subprocess A 202 (such as sensors S11, S12) may be active to a time t, while the sensors active for the subprocess B 204 (such as sensors S21, S22) may be active starting at a time t-n, where n is non-zero. Thus, the raw time-series sensor data 214 is treated to make the data usable for later steps and for artificial intelligence models for predicting aspects of the industrial process 200.

Existing data modes can be categorized into four commonly used modalities: tabular, time series, image, and text. Process data adds to the existing literature of data modalities to create an episodic time-series data as a sub-category of time-series data. The data collection for process episodes is more complex as compared to conventional time-series data because, for each subprocess, a different set of sensor variables (key performance indicators, or KPIs) are being monitored. The differences between conventional time-series data and episodic time-series data can be characterized by the nature of the subprocesses as illustrated in the table below.

| Data Characteristic | Description |
| --- | --- |
| Asynchronous | Each process is monitored at different points in time |
| Varying Length | Monitoring starts at different start- and end-time points |
| Sampling | Frequencies of different sensors are different |
| Unit and Scale | Each sensor has its own natural physical properties with its own units and scales |
| Corelation | Dependence of an episode on another episode |
| Discrete | Every monitoring is a fresh start. |
| Streaming | Data arrive at different times and rates |

As can be seen from the above table, there are several properties of episodic time series data that requires handling differently from conventional time-series data.

Figure 3:
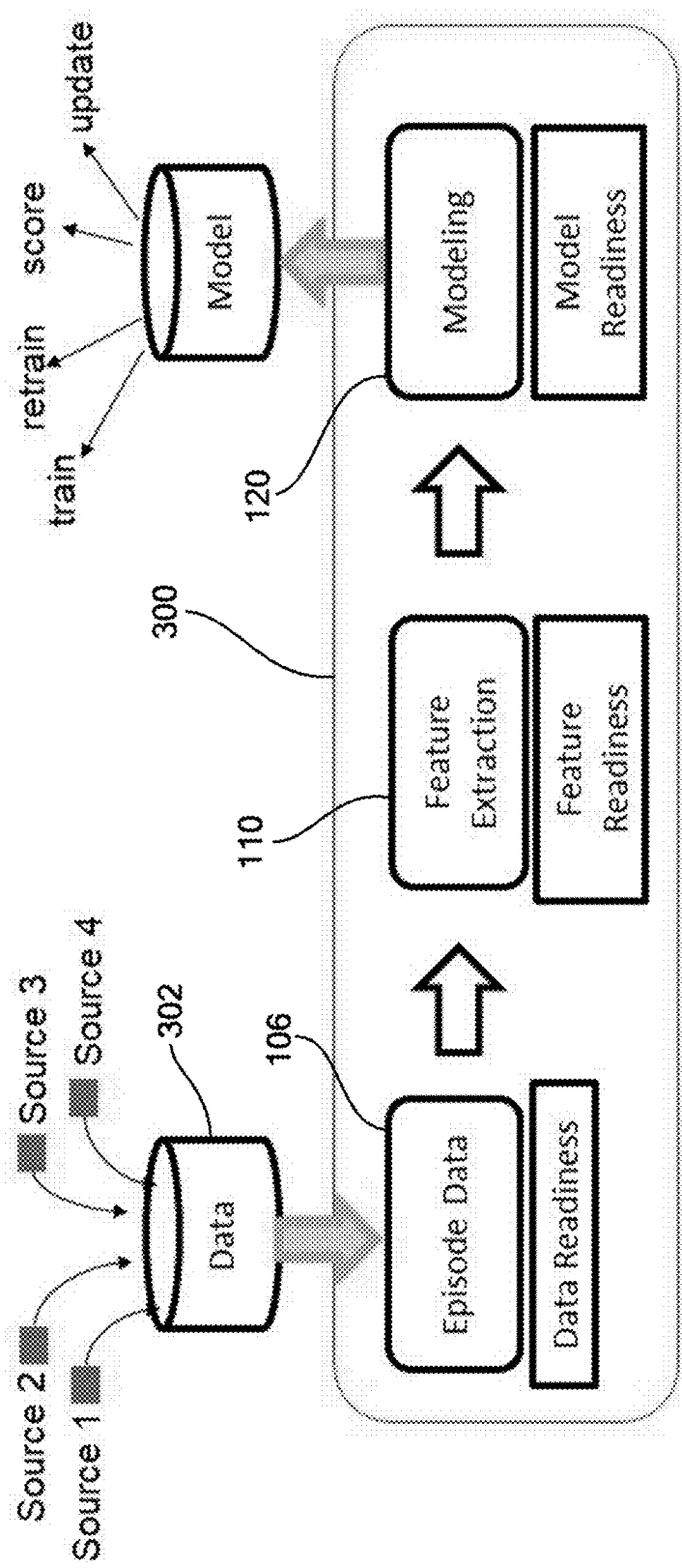
FIG. 3 is a schematic representation of data flow through the system of FIG. 1, consistent with an illustrative embodiment.

Referring to FIGS. 1 and 3, the general usage of episode data from an industrial process is illustrated. The data 302 may be processed by the inventive modules 300, including the episode data generator module 106, the FLOps module 110, and the MLOps+ module 120. The data generator module 106 can provide data readiness. The FLOps module 110 can provide feature readiness because episodic data is large in nature and requires time series analysis. The MLOps+ module 120 can provide model readiness. As discussed below, AI models built on episodic data rely heavily on feature extraction during the model lifetime. Operation of each of these modules 106, 110 and 120 is detailed in the following paragraphs.

Figure 4:
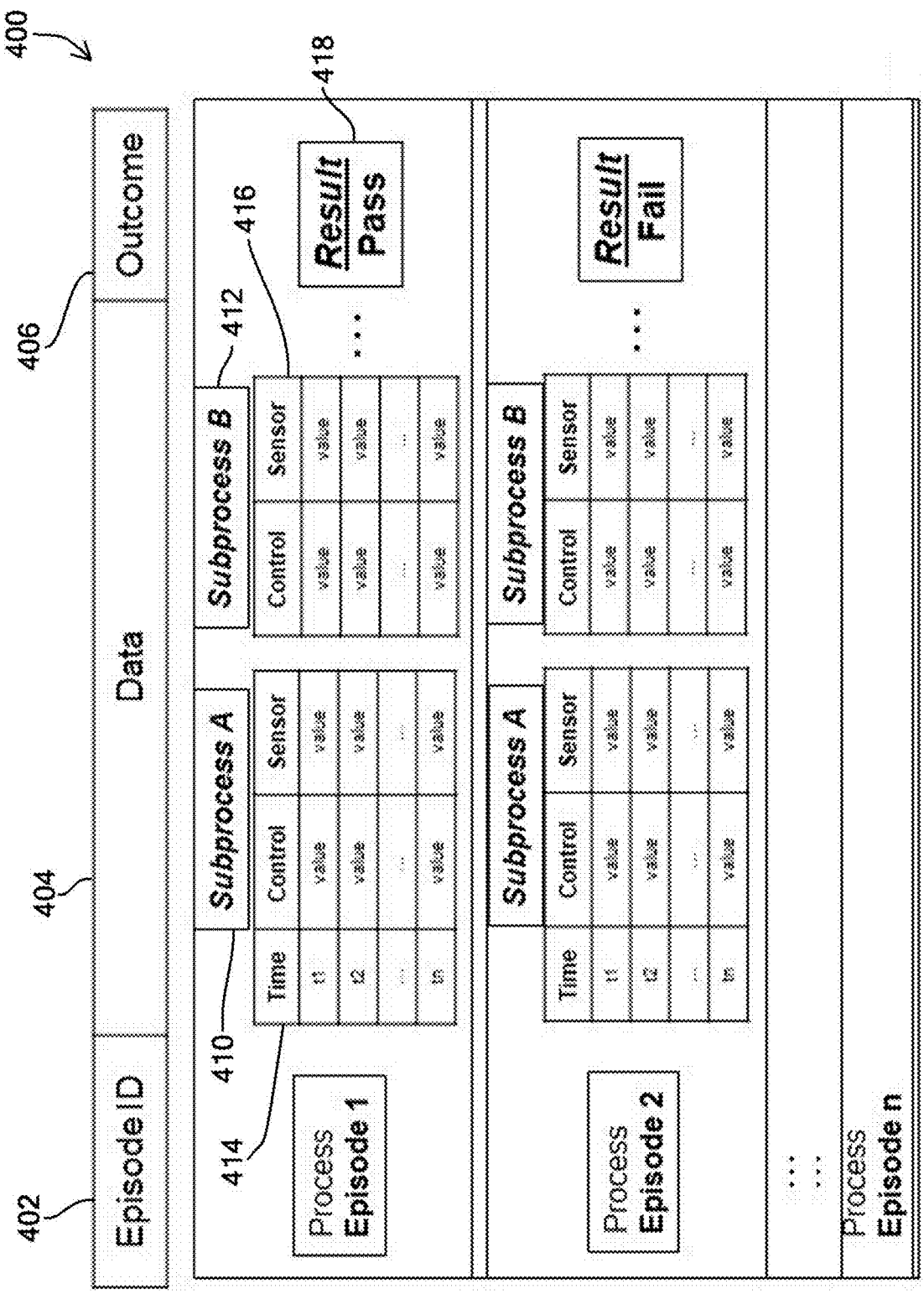
FIG. 4 is a chart illustrating a canonical representation/standardization of episodic data, consistent with an illustrative embodiment.

Referring to FIG. 4, aspects of the present disclosure provide a method for standardization of industrial process data in the form of episodic time series data 400. Each process iteration can map to one episode, such as process episode 1, process episode 2, through process episode n. Each process has one or more subprocesses. Each subprocess of an episode, such as subprocesses A 410 and subprocess B 412 may be organized into a corresponding table, such as table 414 and table 416. Each episode can include the results 418 of the episode. Thus, the episodic time series data 400 can be organized into an Episode ID column 402, a data column 404 and an outcome column 406.

Figure 5:
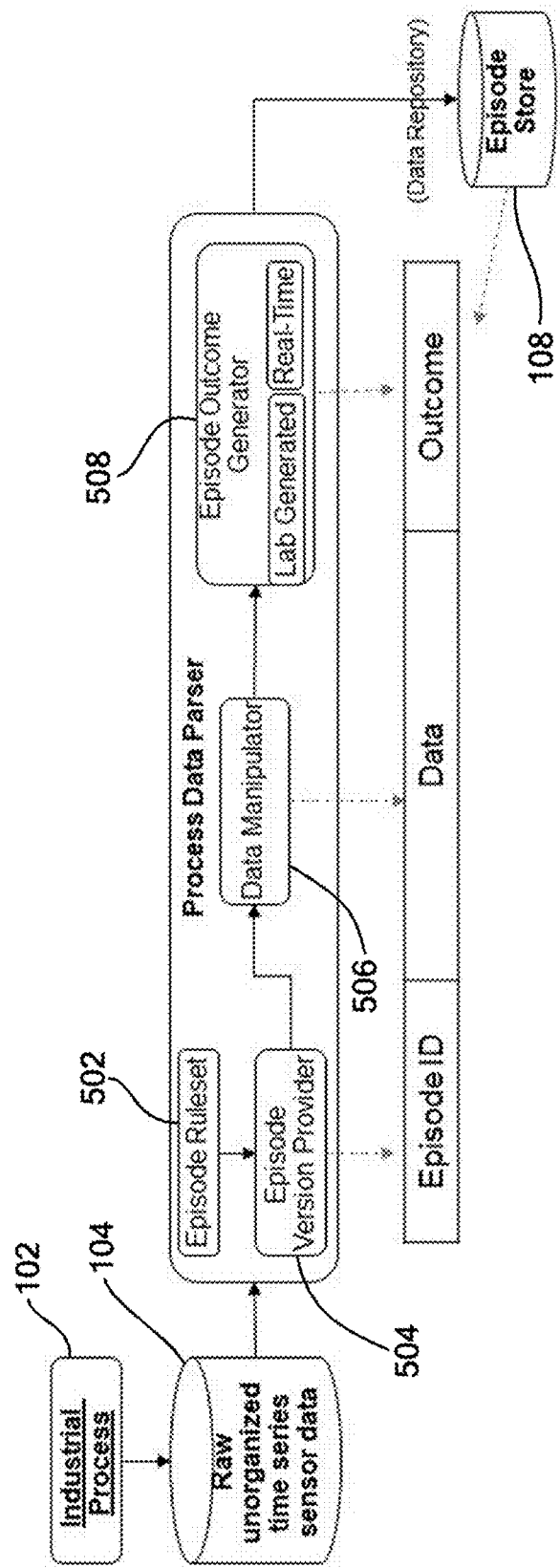
FIG. 5 is a schematic representation of an episodic data generator module, consistent with an illustrative embodiment.

Referring now to FIGS. 1, 4 and 5, the episodic data generator module 106 (see FIG. 1) is described in greater detail. The industrial process 102 generates the raw data 104 which is fed to the episodic data generator module 106. This module can include an episode ruleset 502 that can include domain-driven logic to accommodate customization of episode generation and an episode version provider 504 that provides a unique identifier value to the episode for reference. Such addresses are used to handle the complexities of episode data, as discussed previously. A data manipulator 506 can pre-process and organize the raw time-series data into episodic time-series data. The data manipulator 506 can also handle the complexities of resampling and padding issues between each subprocess time series. An example of such data organization is illustrated in FIG. 4, as discussed above. An episode outcome generator 508 can provide the outcome of the episode immediately based on the process metrics. In some embodiments, there may be a need to evaluate the metrics of outcome through involved testing and it can take days before outcome quality is determined. The data, such as the episodic time series data 400 of FIG. 4, can be stored in the episode store 108.

For any AI model, calculating a large number of features can be wasteful as the AI model may not even be consuming those features for the current episode of data. In addition, computation of all features may be prohibitive given the storage and time constraints. Extracting features for building interpretable models is crucial for episode data. A wide range of features, often 100 or more features, can be extracted from a single variable. If all features are extracted and stored in media, a significant storage overhead is required. If features are generated every time when needed, there is a high execution overhead required. If MLOps drives feature extraction tasks, then the MLOps are adversely affected. Thus, there is a need for optimization of feature extraction processes to dynamically determine and compose the features due to natural changes in the process over time and to keep synchronized with MLOps to optimize implementation of the AI model.

Figure 6:
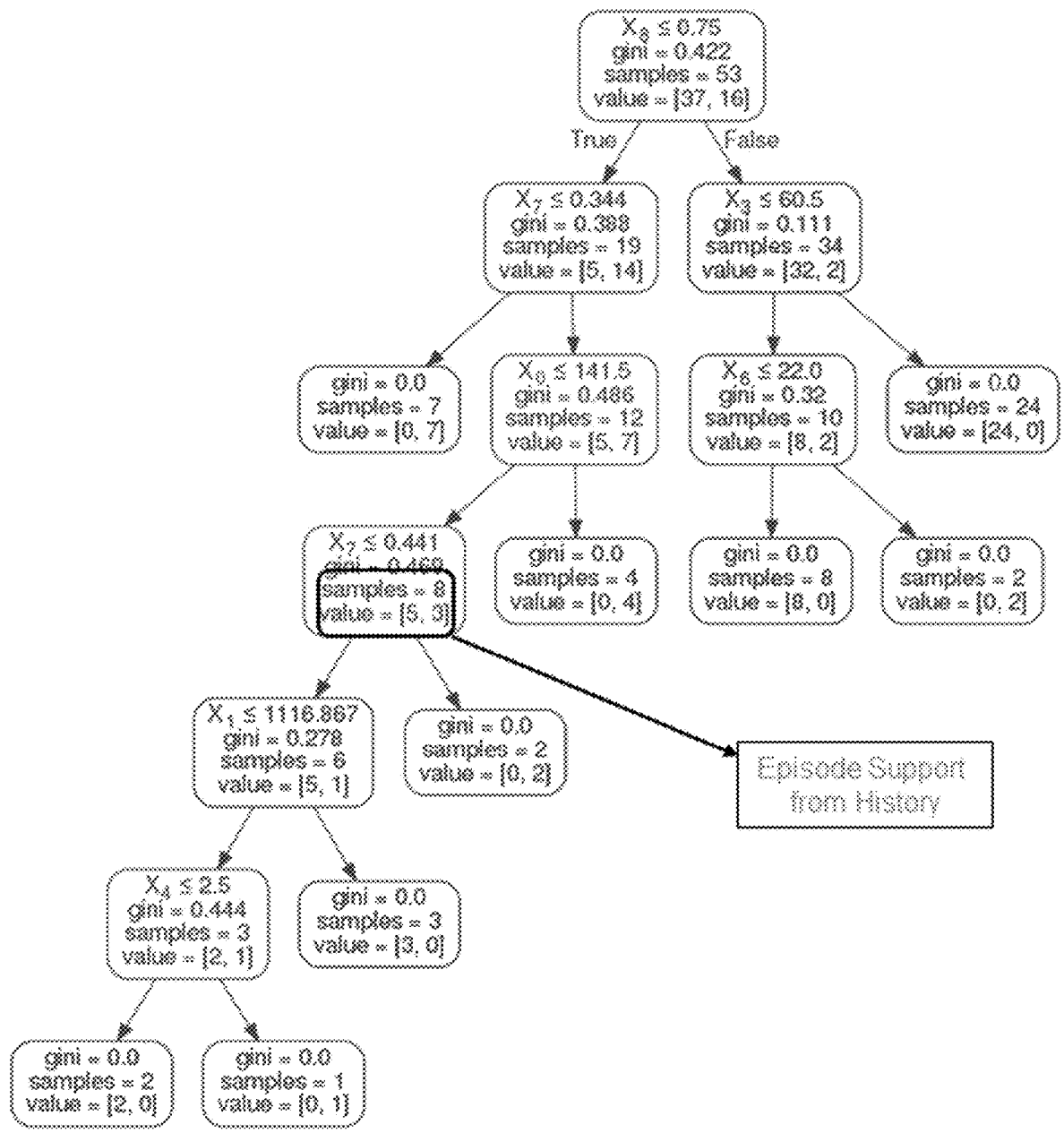
FIG. 6 illustrates an episodic use case using a root cause analysis model, consistent with an illustrative embodiment.

Referring to FIG. 6, a root cause analysis model may be used to rank features according to an importance score, to create a decision tree model and to determine a path through the tree that is most frequently utilized for each application programming interface (API) such as training, scoring and retraining. Each feature, such as features X0 through X8, can include data associated with the feature, including the number of samples processed with that feature, the true and false target values for each sample, and a maximum ranking based on use in various API calls. For example, after some duration of deployment, it can be observed, as shown in FIG. 6, that when "score" API is invoked, there is one path in the tree that is most frequently traversed. Hence, in most cases, this required generation of only a subset of features required by the model for traversing the path. Like "score" API, other APIs, such as train, retrain, predict, update, and the like, also need to have optimized feature engineering. Thus, there is a need to identify and tag the features based on the utility it brings to the AI model. The FLOps module 110 (see FIG. 1), as described in greater detail below, achieves such goals.

Figure 7:
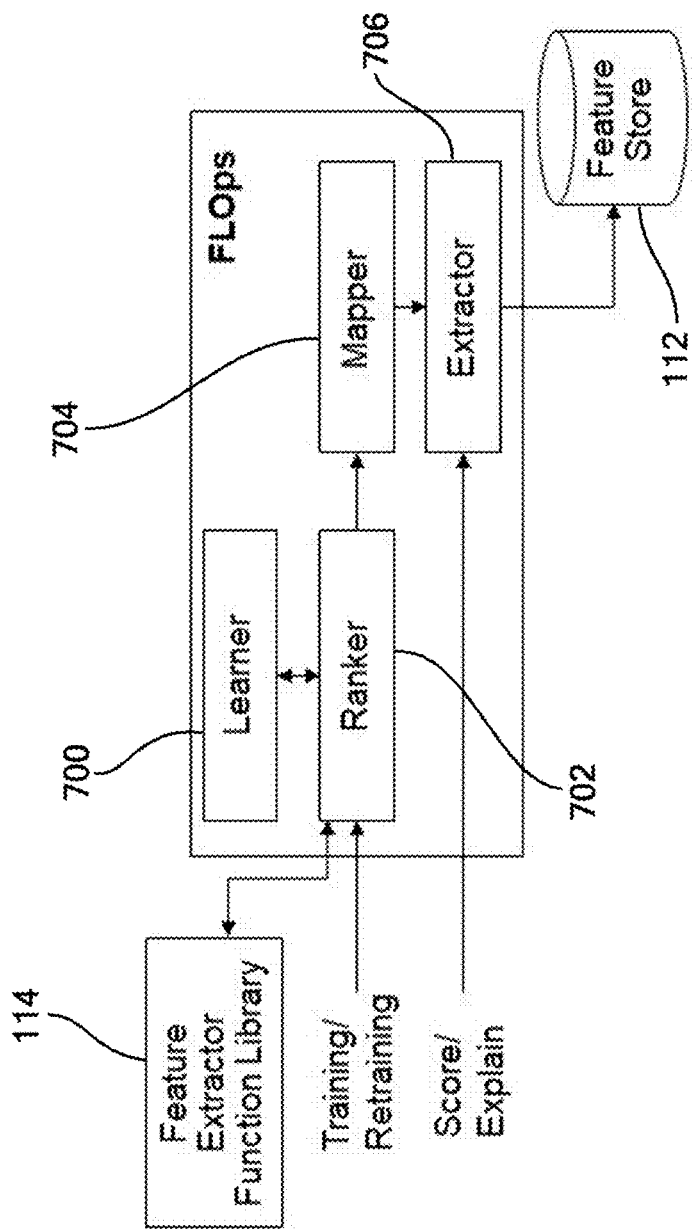
FIG. 7 is a schematic representation of a feature learning operations (FLOps) module, consistent with an illustrative embodiment.

Referring now to FIGS. 1 and 7, a FLOps module 110 is responsible for feature learning and extraction in an AI lifecycle. The FLOps module 110 can include various components, including a learner 700, a ranker 702, a mapper 704, and an extractor 706, each of which are described in greater detail below. The FLOps module 110 can interact with the feature extractor function library 114 and provide features, as needed for the AI models, to the feature store 112.

The ranker 702 can extract all features, rank them and assign categories to the feature. The extraction can be performed for all the features available in the feature extractor function library 114. Ranking of features can be performed based on certain KPIs. Some systems can have predefined KPIs and, in some embodiments, a user can define their own KPIs based on, e.g., feature importance, rate of machine learning operations (such as training, retraining, explanation, and the like), average time taken by each feature extraction method, average episode size, and the number of features synthesized. The ranker 702 can provide a priority tag to each feature on the priority of extraction as shown in the table below, where the highest priority tag, A, may involve features to be extracted on arrival of the episodic time series data. Such features can include, for example, features X6 and X7 as shown in FIG. 6. These features are those of significant importance to the AI model. Some features may be identified with a priority tag B, where the features are considered "borderline". Borderline features, such as feature X6 in FIG. 6, can be extracted when computational resources permit but may not be extracted until required if such resources are not available. Some features may be classified with a feature tag C, referring to a feature extracted on demand. On demand features, such as features X1, X3 in FIG. 6, may be used infrequently and may be extracted from the data when the AI model requires such extraction. Finally, some features may be only extracted upon discovery. These features may be present in the episodic time series data but are of lower importance than on-arrival features.

| Priority tag | Feature extraction when | Sample features from FIG. 7 |
|---|---|---|
| A | On Arrival | X8, X7 |
| B | On Borderline | X6 |
| C | On Demand | X1, X3 |
| D | On Discovery | X11, X12 |

The mapper 704 can store the feature categories discovered in the ranker 702 in the form of a table or JavaScript object notation (json). Based on the request (train, retrain, explain, and the like), the mapper 704 can see which features are extracted and which need to be extracted. The extractor 706 can, based on the feature categories stored in the mapper 704, calculate the features on request and store them in the feature store 112. For example, the extractor 706 can generate those features to be generated on incoming data (on arrival) and what features will be generated on demand, for example. The learner 700 can check if a new feature should be added or not based on a value provided for the feature. As the process evolves, the learner 700 can persist all the features explored by the system and incorporate any new features.

The MLOps+ module 120 (see FIG. 1) can enhance existing machine learning operations capabilities by adding feature engineering capabilities for higher control and optimization. The MLOps+ module 120 can incorporate feedback from the AI model into feature engineering. For example, the MLOps+ module 120 can include a backward feature calculator, where the module provides control over episodes to use for processing different API calls. For example, a predict API call may use the last one episode, the score API can use the last one episode, and the train and retrain API calls can use the last n episodes. Higher weight can be given to more recent episodes as compared to past episodes. Through the backward feature calculator, the MLOps+ module 120 can avoid processing the episode until required, thus improving computing and storage requirements. The MLOps+ module 120 can include two-stage conditional model discovery, where the module can provide control over feature extraction for processing different model API calls. Based on the performance of the models after certain API calls, like retrain, for example, the system can request to incorporate other features which were flagged as irrelevant or previously blacklisted.

The table below illustrates MLOps endpoints and performance enhancements that may be achieved with the MLOps+ module 120 according to certain embodiments of the present disclosure.

| End Point | Description | Performance enhancement using MLOps+ |
|---|---|---|
| Score | Generate Outcome | Quick response time; Already available features |
| Explain | Help to understand the Outcome | Quick response time; Already available features |
| Update | Adjust bookkeeping information | Faster lookup operation |
| Train | Update the internal structure of learning using new parameters/architecture | Higher performance with additional episodes |
| Retrain | Only update internal structure of learning | Higher performance with additional episodes |
| Discover | New feature engineering, new algorithm, new optimization | Higher performance with additional features |

Example

Referring back to FIG. 1, the below example uses the episode data generator module 106 and FLOps module 110 for the dynamic composition of features and illustrates dynamic composition based on system lifecycle, showing use during high system overhead, model retraining, episode explanation, and model training.

The system 100 can receive a batch of raw data 104 after completion of each episode, where the incoming data is processed by the episode data generator 106, as discussed above, and stored in the episode store 108. The episode data generator 106 can generate a label for the new episode and can apply either an applicable process metric, which may not be available immediately or a directly measurable metric. Such metric can indicate a good outcome (satisfactory product) or a bad outcome (under quality threshold). Arrival of the data is communicated to the FLOps module 110. The system 100 can wait for k episodes until L number of bad label episodes are collected, where k»L. The system 100 can communicate to the MLOps+ module 120 for first time training. If the process model is deployed (typically after the first training round), then the communication to the MLOps+ module 120 can be a request for scoring to generate a prediction, interpret features used, determine feature importance, and interpret the data to provide direction as to when an action is required based on the prediction.

In this example, F can be a universal set of feature extraction methods for episode data and stored inside the feature extraction function library 114. A, B, C, and D can be defined as a set of non-overlapping features obtained from F. A can be the list of features to be extracted on arrival of episode data. B can be the list of features to be extracted on demand of episode data, such as for model training or model explanation. C can be a list of blacklisted features not to be extracted. D can be borderline features to be extracted on arrival or on demand, where, as discussed above, the system can perform a dynamic tradeoff based on the rate of data arrival, the rate of on-demand training, and the time and storage needs of the features, for example. Ideally, at the start, A, C and D are empty sets and B includes all the features of interest. Further, ideally, $|F|»(|A|+|B|+=C|+|D|)$ at the start.

Figure 8:
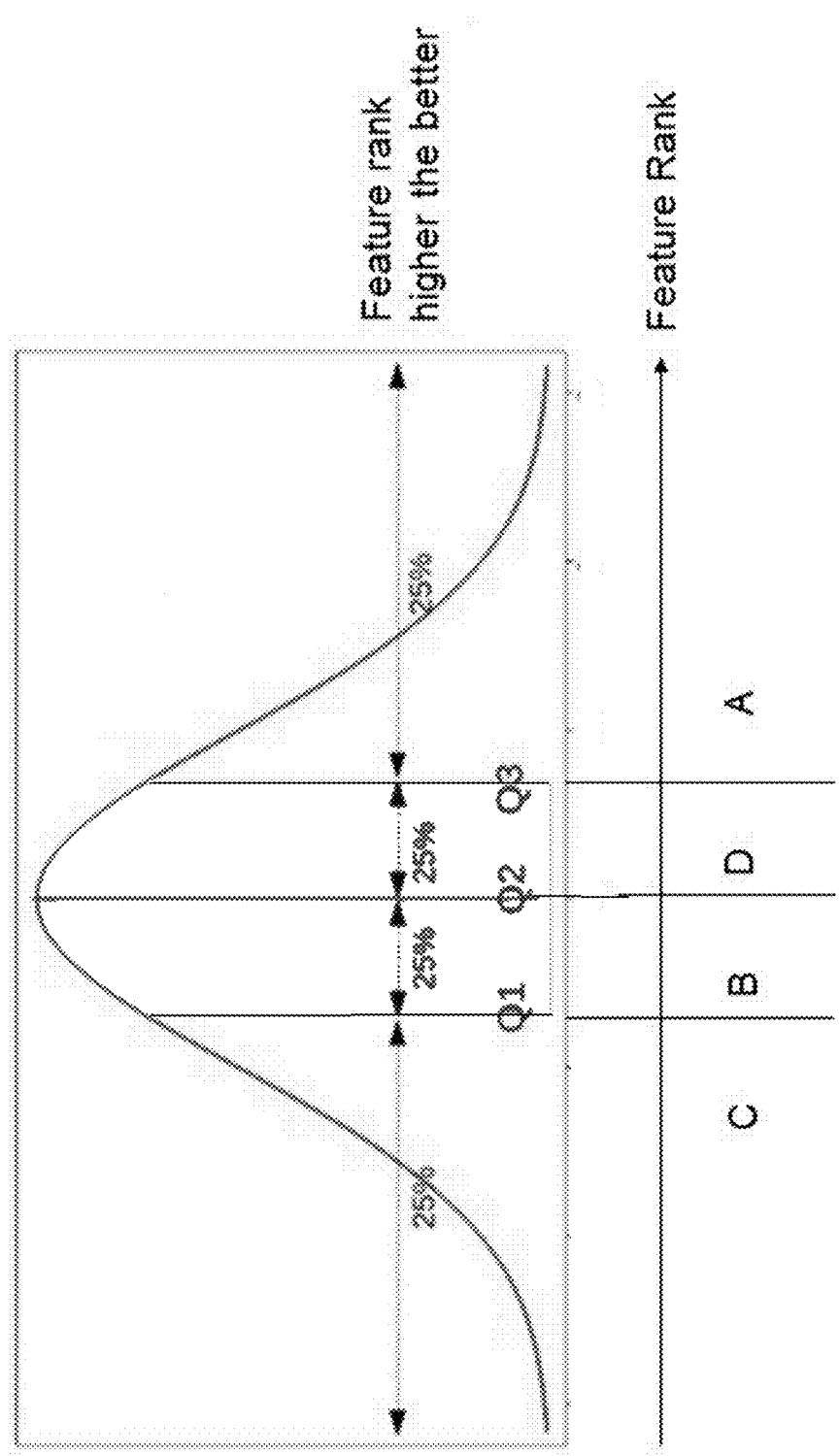
FIG. 8 illustrates the assignment of features into groups, consistent with an illustrative embodiment.

As the system evolves and conducts more model training and model explanation, various metrics can be used to calculate, for each features extraction method over a period of different training rounds, the average time taken by each feature extraction method, the average episode size, the number of features synthesized, the importance of the feature given by model training (predictability), and the importance of the feature given by model explanation. At regular points or after each model training, the system can generate feature ranking for each feature extraction process using a weighted approach. The features can be categorized based on their feature ranking into, for example, 25-75 quantile range (four groups), where group 1 (75-100 percentile) can be assigned to set A, group 2 (25-50 percentile) can be assigned to set B, group C (up to 25 percentile) can be assigned to set C and group 4 (50 to 75 percentile) can be assigned to set D, as shown in FIG. 8.

As illustrated in FIGS. 9 through 14, the features extracted from the episode is dynamic and can change over time. As more episodes are added to the system, the space consumption increases, the feature importance can vary as data changes, the model explanation also can vary as data changes (i.e., some features are preferred), the system can decide to drop some old episodes that are no longer useful, and the rate at which model training is conducted can be reduced (assuming the model is more stable for large data).

Figure 9:
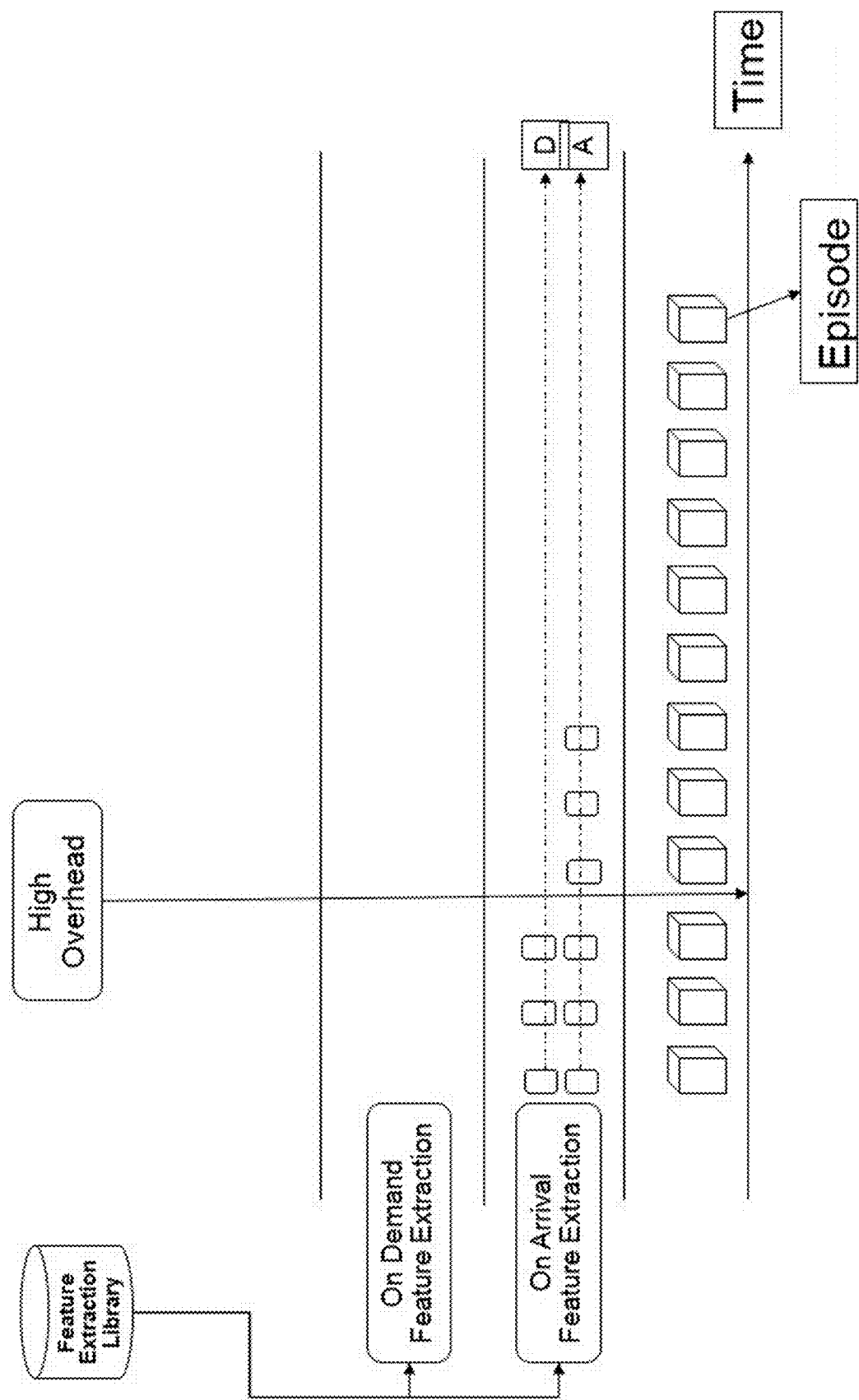
FIG. 9 illustrates a dynamic composition of features for episode data when a high overhead condition is detected.

In FIG. 9, as episodic time series data arrives from the episode data generator, set A (on arrival) features are extracted as well as set D (borderline) features. When a high overhead state is reached, the borderline features (set D) are no longer processed and only the on arrival (set A) features continue to be processed.

Figure 10:
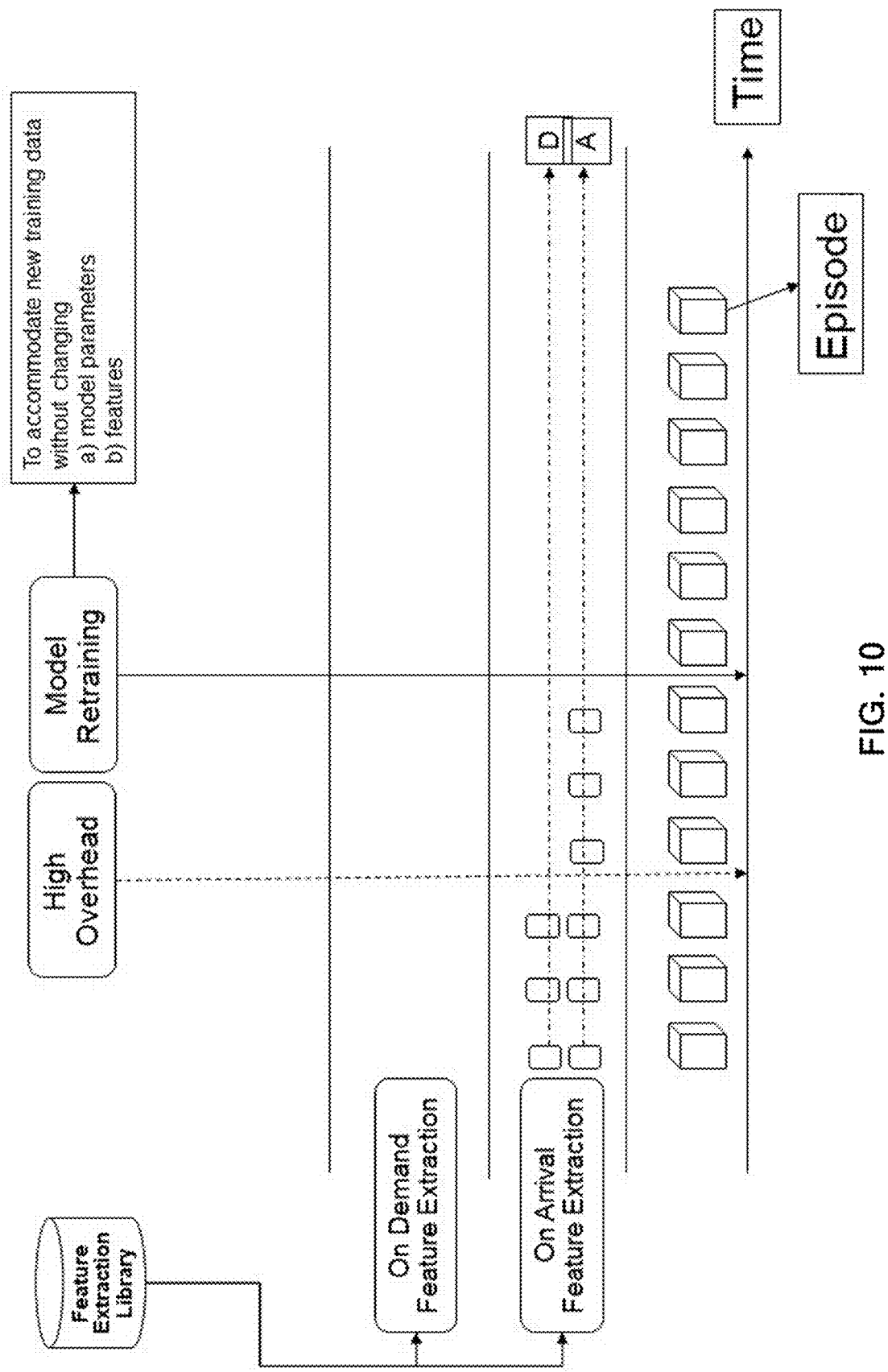
FIG. 10 illustrates a dynamic composition of features for episode data after a high overhead condition is detected prior to a model retraining request.
Figure 11:
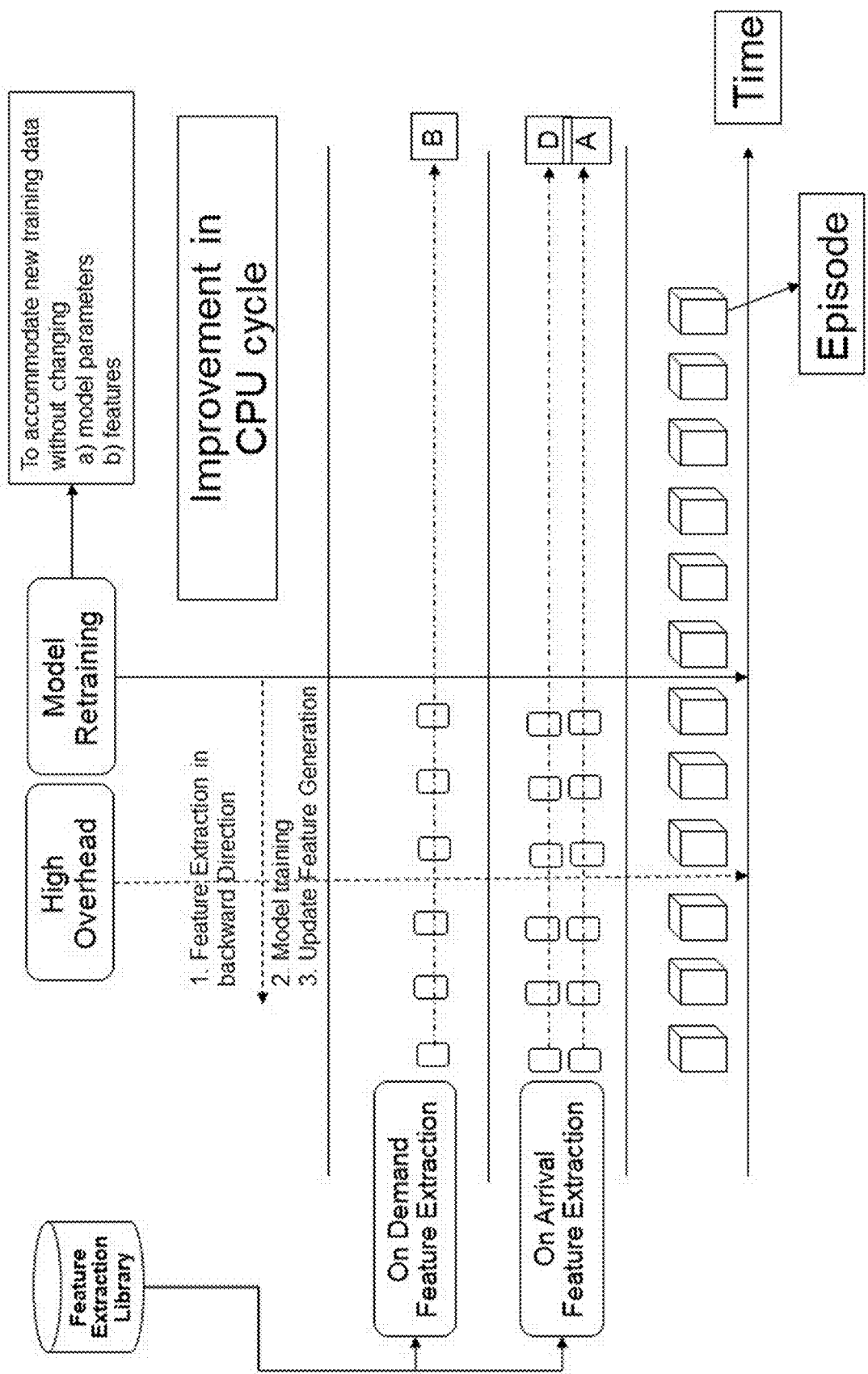
FIG. 11 illustrates a dynamic composition of features for episode data when a model retraining request is received.

In FIGS. 10 and 11, when a model retraining API is called to accommodate new training data without changing model parameters or features, feature extraction is performed in a backward direction, where the unextracted borderline features (set D) and the on demand features (set B) are extracted chronologically backwards over the previous episodes. Model training can be performed and feature generation and be updated.

Figure 12:
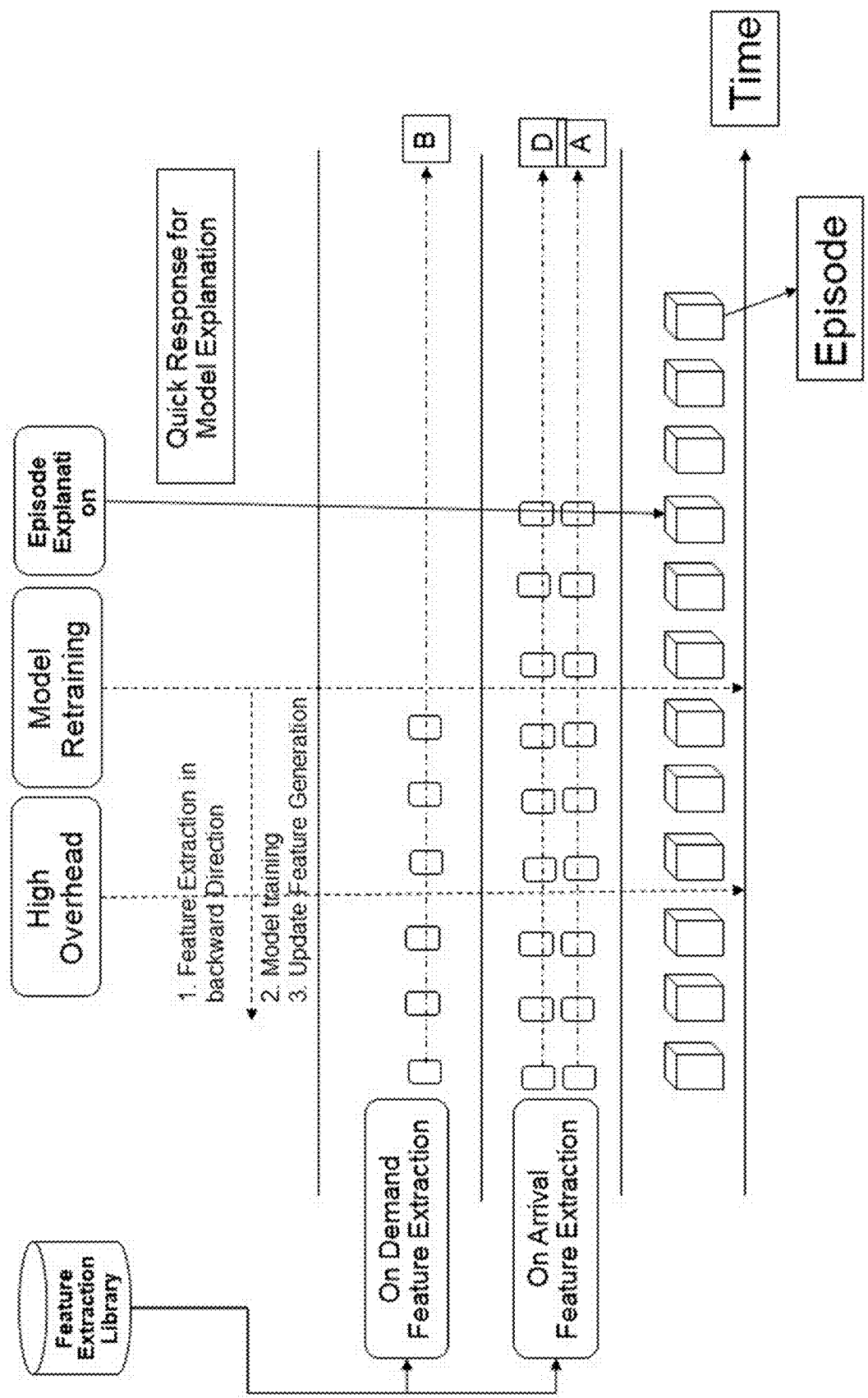
FIG. 12 illustrates a dynamic composition of features for episode data after an episode explanation request is received.

In FIG. 12, when an episode explanation API is called, the system can respond quickly because the features needed have already been extracted or, if there has been high overhead, only those borderline features needed for the episode explanation API would need to be extracted, as the on arrival features are already extracted from the data.

Figure 13:
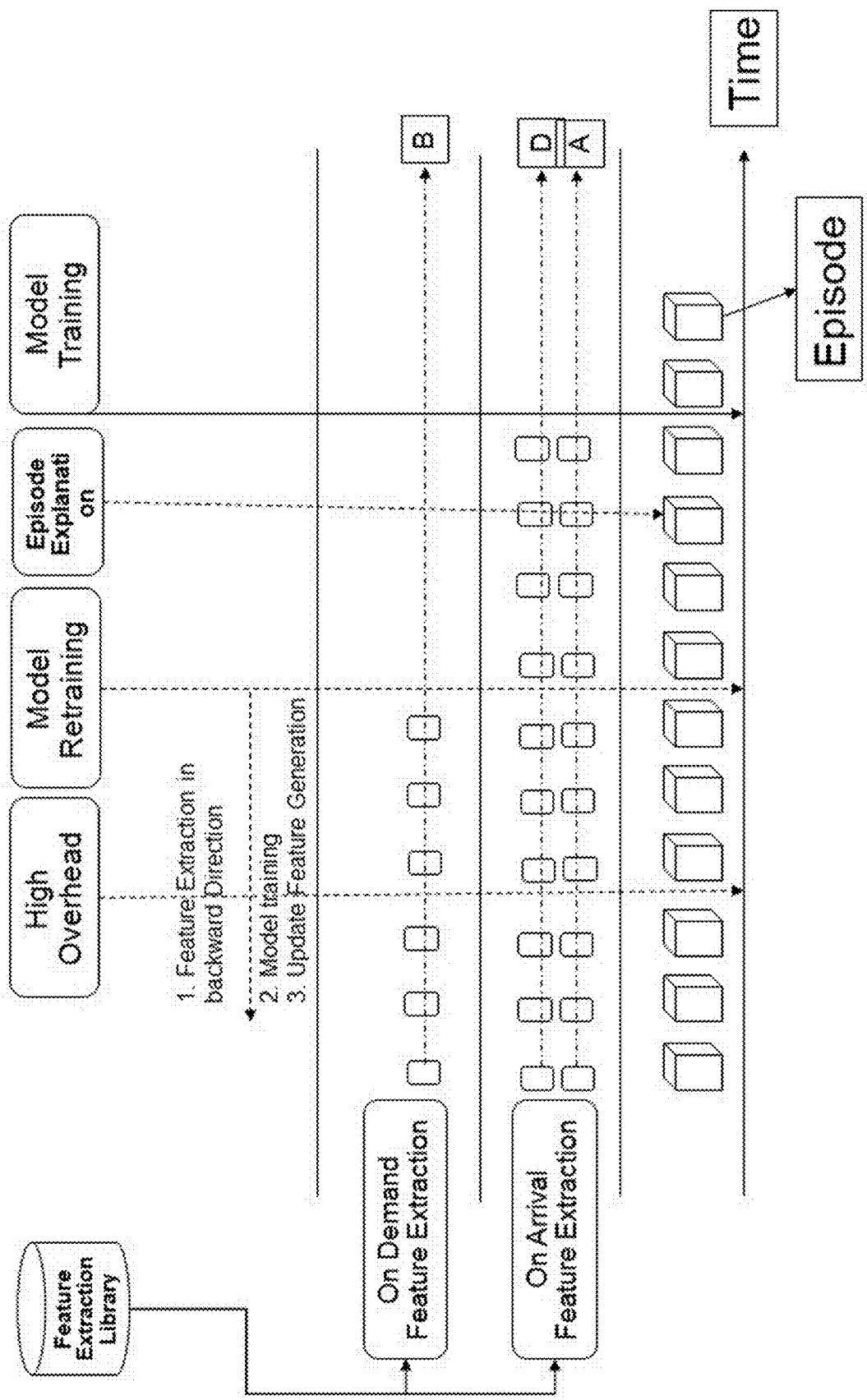
FIG. 13 illustrates a dynamic composition of features for episode data when a model training request is received.
Figure 14:
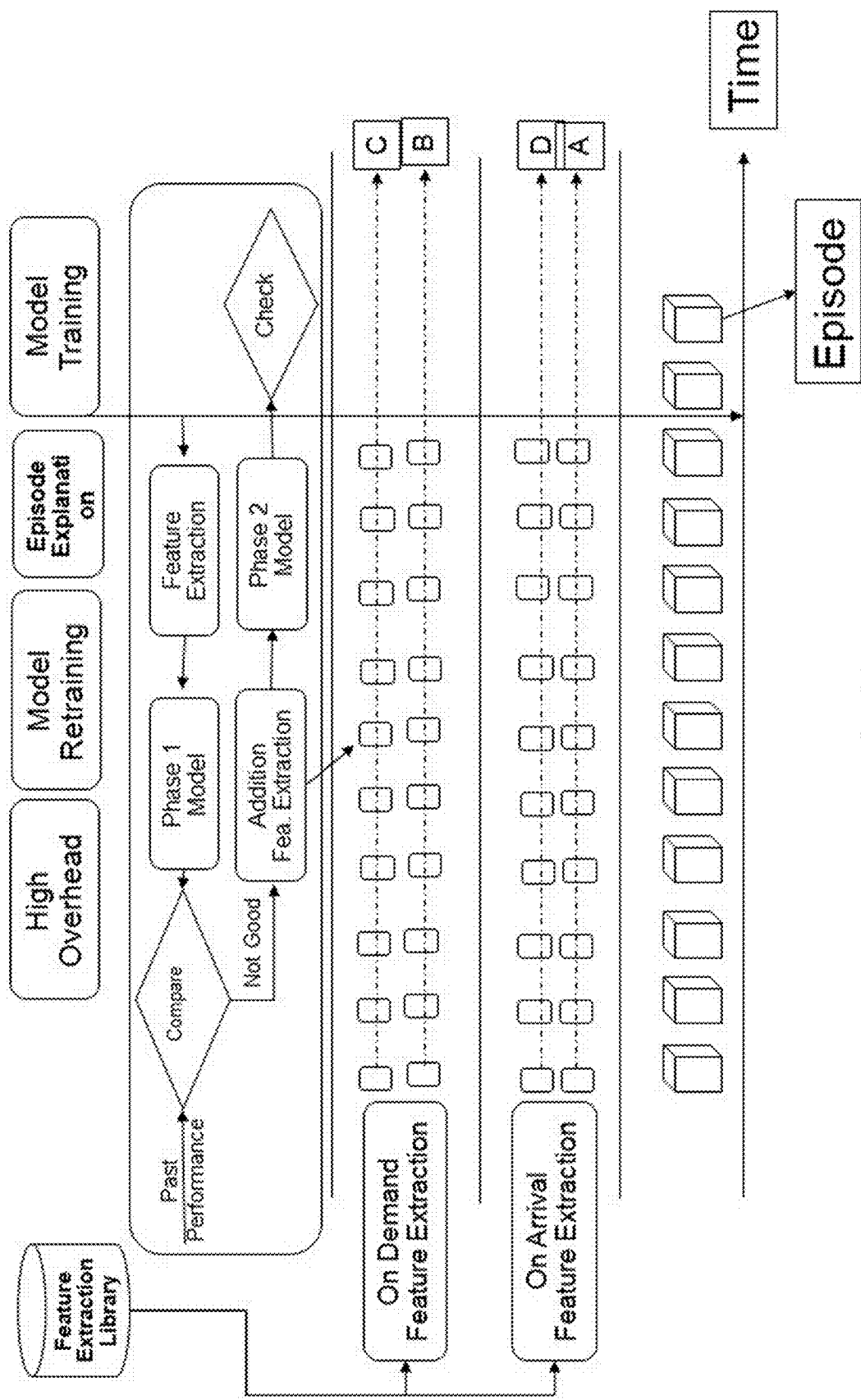
FIG. 14 illustrates a dynamic composition of features for episode data after the model training request is received.

In FIGS. 13 and 14, when a model training API is called, the system may extract both features of set B (on demand) and set C (blacklisted), in a reverse chronological order, where the extracted features for a previous episode are run on a first phase model and compared with past performance. If the performance is not improved beyond a threshold, an additional episode data is obtained, and features extracted to run a second phase model. The results are checked, and the model training may continue depending on the model performance achieved and a pre-set model training time.

Example Process

Figure 15:
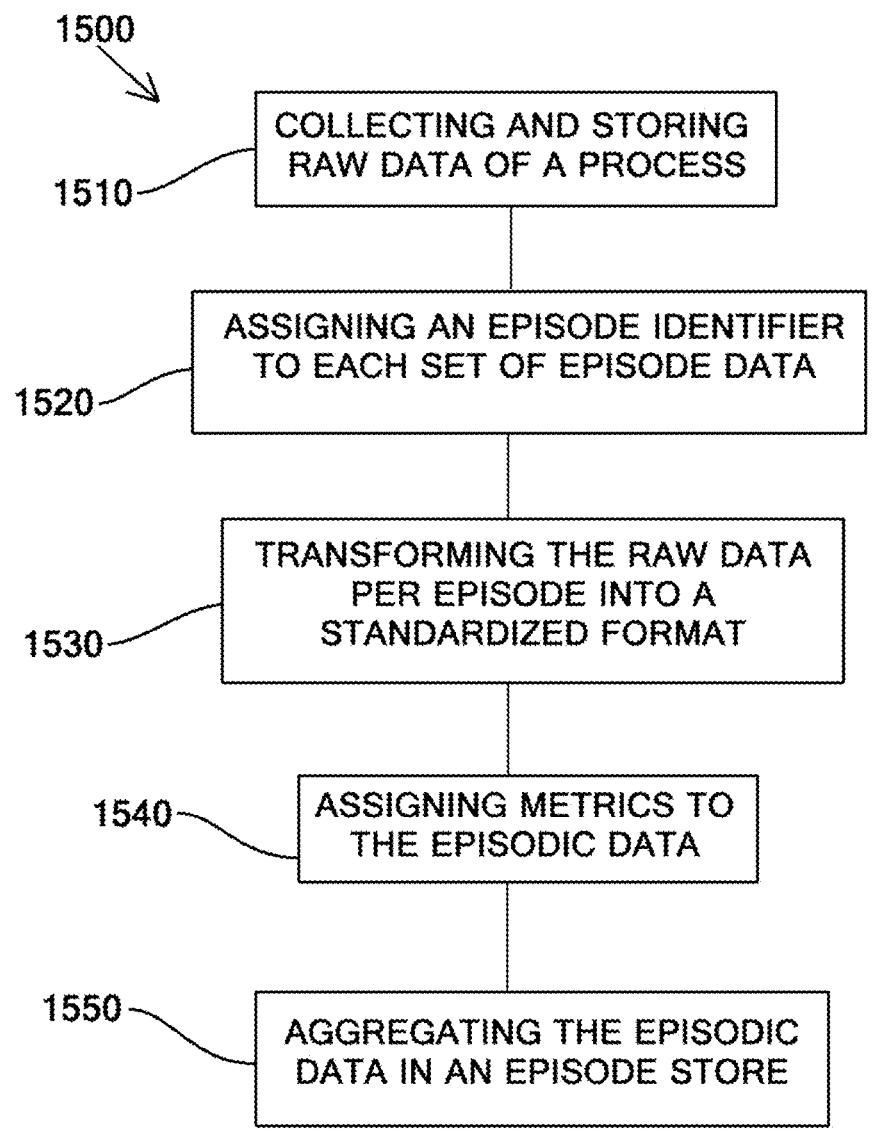
FIG. 15 illustrates a method, consistent with an illustrative embodiment.

With the foregoing overview of the example system 100 (see FIG. 1), it may be helpful now to consider a high-level discussion of an example process. To that end, FIG. 15 presents an illustrative process related to standardization of data from an industrial process. Process 1500 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the process 600 is described with reference to the system 210 of FIG. 2.

Referring to FIG. 15, the process 1500 for preparing process data for use in an artificial intelligence (AI) model includes an act 1510 of collecting and storing raw data as episodic data for each episode of a process. The process 1500 further includes an act 1520 of assigning, by an episode data generator, an episode identifier to each set of episodic data. The process 1500 further includes an act 1530 of transforming the raw data per episode into a standardized episodic data format usable by the AI model. The process 1500 further includes an act 1540 of assigning metrics to the episodic data. The metrics, as discussed above, may be lab generated metrics or real time metrics. Finally, the process 1500 includes an act 1550 of aggregating the episodic data in an episode store.

Figure 16:
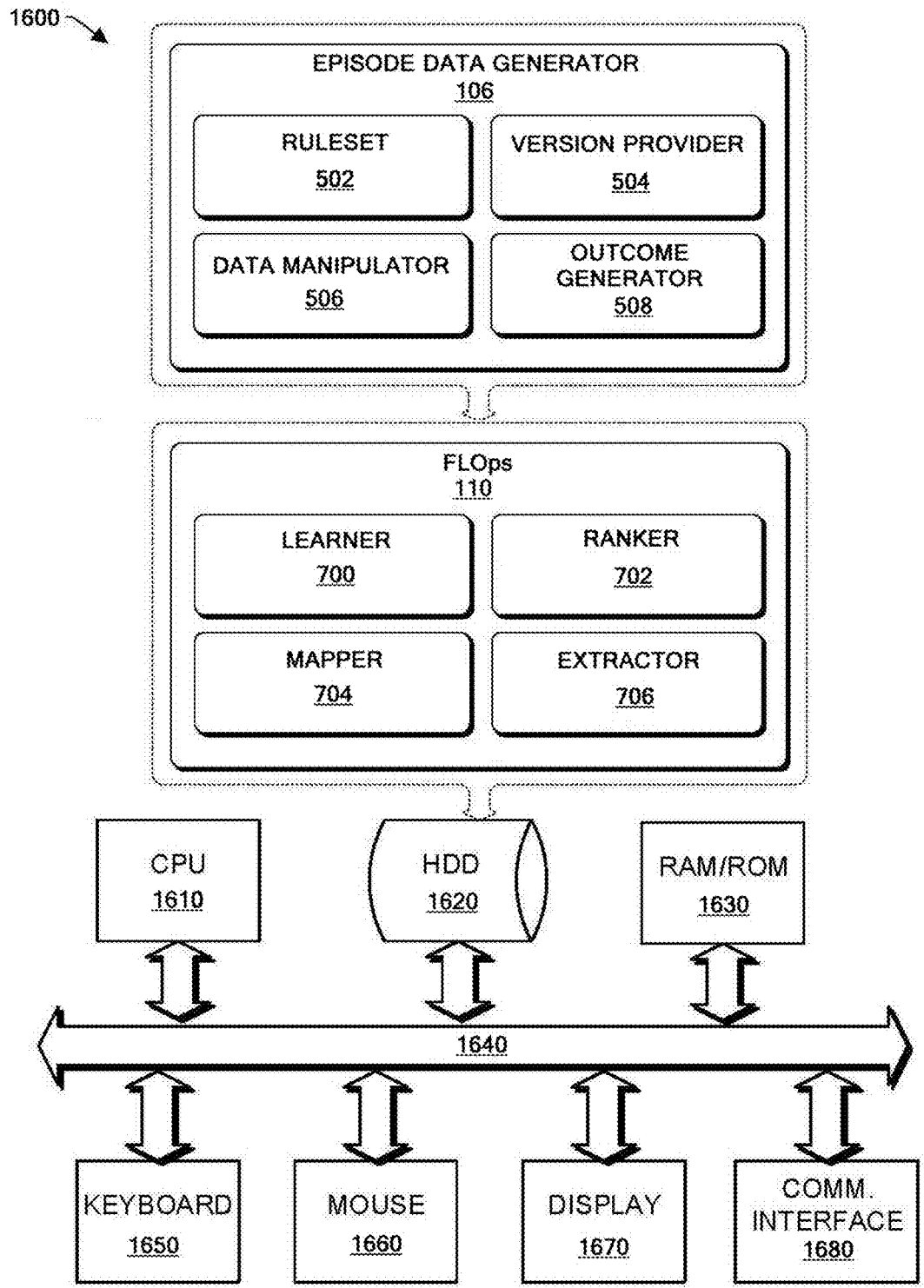
FIG. 16 is a functional block diagram illustration of a computer hardware platform that can be used to implement the system of FIG. 1.

FIG. 16 provides a functional block diagram illustration of a computer hardware platform 1600 that can be used to implement a particularly configured computing device that can host an episode data generator 106 and a features learning and extraction operation module 110. The episode data generator 106, as discussed above, can include a ruleset 502, a version provider 504, a data manipulator 506 and an outcome generator 508. The FLOps module 110, as discussed above, can include a learner 700, a ranker 702, a mapper 704 and an extractor 706. In particular, FIG. 16 illustrates a network or host computer platform 1600, as may be used to implement an appropriately configured system 100, as illustrated in FIG. 1.

The computer platform 1600 may include a central processing unit (CPU) 1610, a hard disk drive (HDD) 1620, random access memory (RAM) and/or read only memory (ROM) 1630, a keyboard 1650, a mouse 1660, a display 1670, and a communication interface 1680, which are connected to a system bus 1640.

In one embodiment, the HDD 1620, has capabilities that include storing a program that can execute various processes, such as the episode data generator 106 and the FLOps module 110, in a manner described herein.

Conclusion

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method of preparing process data for use in an artificial intelligence (AI) model, the method executed by one or more processors of a computer, the method comprising:
    collecting and storing raw data as episodic data for each episode of a process;
    assigning an episode identifier each set of episodic data;
    transforming the raw data per episode into a format of standardized episodic data usable by the AI model;
    assigning metrics to the standardized episodic data;
    aggregating the standardized episodic data in an episode store;
    improving a processor cycle efficiency and decreasing storage requirements of the computer by:
        processing the standardized episodic data related to on arrival features as the data is received;
        processing the standardized episodic data related to borderline features when computation resource usage permits; and
        processing the standardized episodic data related to on demand features when needed by the AI model, and
    optimizing feature generation tasks when an application programming interface (API) call of the AI model is invoked.

2. The computer implemented method of claim 1, wherein the metrics assigned to the episodic data include lab-generated and real-time metrics.

3. The computer implemented method of claim 1, wherein the standardized episodic data format includes a table for a subprocess of the episode, the table including, for a time step of the subprocess, a control variable value associated with each time step and a sensor value associated with each time step.

4. The computer implemented method of claim 1, further comprising communicating an arrival of the standardized episodic data to a feature learning operations (FLOps) module.

5. The computer implemented method of claim 4, further comprising waiting for a number of episodes of the standardized episodic data until a predetermined number of outcomes of the assigned metrics fall below a quality threshold.

6. The computer implemented method of claim 4, further comprising assigning, by the FLOps module, features of the standardized episodic data to a feature tag selected from one of on arrival features, borderline features, on demand features, or blacklisted features.

7. The computer implemented method of claim 6, wherein the features are assigned the feature tags based on key performance indicators for measuring a priority of extraction.

8. The computer implemented method of claim 1, further comprising:
    determining a number of recent historical episodes from which features are to be extracted for different API calls;
    extracting features from selected episodes using the assigned feature tags;
    sending the extracted features to the AI model; and
    evaluating a performance of the AI model based on standardized episodic data related to the extracted features.

9. The computer implemented method of claim 8, further comprising:
    ranking and re-assigning the feature tags to features based on the key performance indicators for measuring priority of extraction; and
    evaluating the performance of the AI model based on standardized episodic data related to the re-assigned feature tags.

10. A computer implemented method for managing feature learning and extraction in an artificial intelligence (AI) lifecycle, the method executed by one or more processors of a computer comprising:
    improving a processor cycle efficiency and decreasing storage requirements of the computer by:
        ranking and assigning feature tags to features based on key performance indicators for measuring a priority of feature extraction, wherein the features are ranked according to a root cause analysis model; and storing the feature tags for reference during the feature extraction;

extracting the features from episodes based on an application programming interface (API) request of an AI model using the stored feature tags;

controlling a features library from which the features are selected for ranking and assigning feature tags;

determining a most probable path through a root cause analysis model decision tree; and calculating the features in the most probable path.

11. A non-transitory computer readable storage medium tangibly embodying a computer readable program code having computer readable instructions that, when executed, causes a computer device to carry out a method of preparing process data for use in an artificial intelligence (AI) model, the method comprising:

collecting and storing raw data as episodic data for each episode of a process;

assigning an episode identifier each set of episodic data;

transforming the raw data per episode into a format of standardized episodic data usable by the AI model;

assigning metrics to the standardized episodic data;

aggregating the standardized episodic data in an episode store; and improving a processor cycle efficiency and decreasing storage requirements of the computer device by:

processing the standardized episodic data related to on arrival features as the raw data is received;

processing the standardized episodic data related to borderline features when computation resource usage permits; and processing the standardized episodic data related to on demand features when needed by the AI model; and optimizing feature generation tasks when an application programming interface (API) call of the AI model is invoked.

12. The non-transitory computer readable storage medium of claim 11, wherein the standardized episodic data format includes a table for each subprocess of the episode, the table including, for each time step of the subprocess, each control variable value associated with each time step and each sensor value associated with each time step.

13. The non-transitory computer readable storage medium of claim 11, wherein the execution of the code by the processor further configures the computing device to perform acts comprising:

communicating the arrival of data to a feature learning operations (FLOps) module; and assigning, by the FLOps module, features of the standardized episodic data to a feature tag selected from one of on arrival features, borderline features, on demand features, or blacklisted features.

14. The non-transitory computer readable storage medium of claim 11, wherein the features are assigned the feature tags based on key performance indicators for measuring a priority of feature extraction.

\* \* \* \* \*